(12) United States Patent
Friedrich et al.

(10) Patent No.: US 11,433,773 B2
(45) Date of Patent: Sep. 6, 2022

(54) CHARGING HARNESS UNIT FOR A BATTERY OF A MOTOR VEHICLE

(71) Applicant: Bayerische Motoren Werke Aktiengesellschaft, Munich (DE)

(72) Inventors: Thomas Friedrich, Woerthsee (DE); Johannes Ott, Munich (DE); Josef Poemmerl, Furth (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/259,011

(22) PCT Filed: Sep. 13, 2019

(86) PCT No.: PCT/EP2019/074574
§ 371 (c)(1),
(2) Date: Jan. 8, 2021

(87) PCT Pub. No.: WO2020/058137
PCT Pub. Date: Mar. 26, 2020

(65) Prior Publication Data
US 2021/0300193 A1    Sep. 30, 2021

(30) Foreign Application Priority Data

Sep. 18, 2018    (DE) ..................... 10 2018 215 875.4

(51) Int. Cl.
*B60L 53/18* (2019.01)
*B60L 53/302* (2019.01)
(Continued)

(52) U.S. Cl.
CPC .............. *B60L 53/18* (2019.02); *B60L 53/11* (2019.02); *B60L 53/16* (2019.02); *B60L 53/302* (2019.02);
(Continued)

(58) Field of Classification Search
CPC ........ B60L 53/18; B60L 53/302; B60L 53/11; B60L 53/16; B60L 2240/545; H01B 7/423; H02G 3/03
(Continued)

(56) References Cited

U.S. PATENT DOCUMENTS 5,909,099 A    6/1999  Watanabe et al.
5,917,307 A *  6/1999  Watanabe ............... H01F 38/14
                                                    320/108
(Continued)

FOREIGN PATENT DOCUMENTS

CN    102629506 A  *  8/2012   ............. H01B 7/423
CN    106347166 A  *  1/2017   .......... B60L 11/1816
(Continued)

OTHER PUBLICATIONS

International Search Report (PCT/ISA/210) issued in PCT Application No. PCT/EP2019/074574 dated Nov. 11, 2019 with English translation (five (5) pages).
(Continued)

*Primary Examiner* — Suresh Memula
(74) *Attorney, Agent, or Firm* — Crowell & Moring LLP

(57) ABSTRACT

A charging harness unit for a battery of a motor vehicle includes a charging harness which has at least one lead and respective ends, one end being on the battery side and the other end being for connecting to a vehicle-external charging station. A cooling channel through which a coolant can flow is arranged in the charging harness. The cooling channel can be supplied with the coolant via a cooling device arranged on the vehicle side.

20 Claims, 3 Drawing Sheets

(51) Int. Cl.
    *B60L 53/10*      (2019.01)
    *B60L 53/16*      (2019.01)
    *H01B 7/42*      (2006.01)
    *H02G 3/03*      (2006.01)

(52) U.S. Cl.
    CPC .............. *H01B 7/423* (2013.01); *H02G 3/03* (2013.01); *B60L 2240/545* (2013.01)

(58) Field of Classification Search
    USPC ......................................................... 320/109
    See application file for complete search history.

(56) References Cited

U.S. PATENT DOCUMENTS

| | | | |
|---|---|---|---|
| 10,029,575 B2 * | 7/2018 | Remisch | H01R 13/005 |
| 10,717,367 B1 * | 7/2020 | Price | B60L 53/14 |
| 2013/0241486 A1 | 9/2013 | Tomokage et al. | |
| 2014/0070013 A1 * | 3/2014 | Stanek | B60L 58/20 |
| | | | 237/28 |
| 2015/0217654 A1 * | 8/2015 | Woo | B60L 53/18 |
| | | | 320/109 |
| 2016/0200206 A1 | 7/2016 | Woo et al. | |
| 2017/0144558 A1 | 5/2017 | Remisch | |
| 2017/0338006 A1 * | 11/2017 | Gontarz | B60L 3/00 |
| 2018/0190410 A1 * | 7/2018 | Cao | H01B 9/006 |
| 2018/0236884 A1 | 8/2018 | Grienitz et al. | |
| 2018/0277283 A1 * | 9/2018 | Remisch | B60L 53/16 |
| 2019/0168593 A1 * | 6/2019 | Nakaso | H01B 7/423 |
| 2019/0291588 A1 * | 9/2019 | Chou | H01R 13/405 |
| 2019/0385765 A1 * | 12/2019 | Lyon | B60L 53/18 |

FOREIGN PATENT DOCUMENTS

| | | | | |
|---|---|---|---|---|
| CN | 106849227 A | | 6/2017 | |
| CN | 106887277 A | * | 6/2017 | |
| CN | 108922658 A | * | 11/2018 | ........... H01B 7/0045 |
| CN | 109791821 A | * | 5/2019 | .............. B60L 53/18 |
| CN | 105121220 B | * | 8/2019 | ........... B60L 11/1874 |
| CN | 110087936 A | * | 8/2019 | .............. B60L 53/14 |
| DE | 10 2015 120 048 A1 | | 5/2017 | |
| DE | 10 2017 004 468 A1 | | 11/2017 | |
| DE | 102016117439 A1 | * | 3/2018 | .............. B60L 53/16 |
| DE | 10 2017 103 271 A1 | | 8/2018 | |
| DE | 102015101140 B4 | * | 10/2019 | .............. B60L 53/16 |
| EP | 0823766 A1 | * | 2/1998 | |
| EP | 823766 A1 | * | 2/1998 | ........... A61K 31/726 |
| EP | 0823767 A1 | * | 2/1998 | |
| EP | 3549813 A1 | * | 10/2019 | .............. B60K 1/04 |
| EP | 3572271 A1 | * | 11/2019 | .............. B60L 53/11 |
| EP | 3588686 A1 | * | 1/2020 | .............. B60L 53/00 |
| WO | WO-2017133893 A1 | * | 8/2017 | .............. B60L 53/16 |
| WO | WO-2019030331 A | * | 2/2019 | .............. B60L 53/11 |
| WO | WO-2021013919 A1 | * | 1/2021 | .............. B60L 53/11 |
| WO | WO-2021091216 A1 | * | 5/2021 | |

OTHER PUBLICATIONS

German-language Written Opinion (PCT/ISA/237) issued in PCT Application No. PCT/EP2019/074574 dated Nov. 11, 2019 (five (5) pages).

German-language Search Report issued in German Application No. 10 2018 215 875.4 dated Aug. 5, 2019 with partial English translation (12 pages).

* cited by examiner

CHARGING HARNESS UNIT FOR A BATTERY OF A MOTOR VEHICLE

BACKGROUND AND SUMMARY OF THE INVENTION

The invention relates to a charging harness unit for a battery of a motor vehicle.

Known from US 2016/0200206 A1 is a charging system for a vehicle that can be operated electrically. The charging system comprises an energy source and a cable that is attached at one end to the energy source and at the other end is connected to a connection element of the charging system. The connection element can be connected to a charging connector of the motor vehicle that can be operated electrically, in order to charge the motor vehicle. This means that the charging system is a charging system external to the vehicle, by means of which electrical energy can be provided to charge the motor vehicle. It is provided in this case that the cable and the connection element are cooled by means of a cooling circuit, such that the charging system can provide the electrical energy for the motor vehicle at a particularly high output.

If the electrical energy is provided by the charging system at the particularly high output, a rate of charging of the motor vehicle may depend on a maximum receiving capacity of the motor vehicle for the electrical energy.

It is thus the object of the present invention to create a charging unit for a battery of a motor vehicle that enables the motor vehicle to have a particularly high receiving capacity for the electrical energy.

This object is achieved according to the invention by a charging harness unit for a battery of a motor vehicle having the features of an independent claim. Advantageous embodiments of the invention are provided by the dependent claims and the description.

The invention relates to a charging harness unit, which may also be referred to as a set of leads, for a battery of a motor vehicle, having a charging harness that has least one lead, which in particular is a charging cable, and respective ends on the battery side and for connecting to a charging station that is external to the vehicle. The battery is, in particular, a high-voltage accumulator, by means of which electrical energy can be provided for an electric drive of the motor vehicle, in order to drive the motor vehicle electrically. The motor vehicle is, in particular, a motor vehicle that can be operated electrically, in particular a passenger car that can be operated electrically. Arranged in the charging harness there is a cooling channel through which a cooling fluid can flow.

To enable the motor vehicle to have a particularly high receiving capacity for the electrical energy, it is provided according to the invention that the cooling channel can be supplied with the cooling fluid via a cooling device arranged on the vehicle side. The charging harness thus electrically connects a vehicle-side charging interface, which can be connected to a corresponding connection element of the charging station that is external to the vehicle, to the battery of the motor vehicle. Consequently, the at least one lead can in each case be electrically connected to the battery, which in particular is the high-voltage accumulator, and the vehicle-side charging interface, which may also be referred to as a charging element and which, in particular, is a charging socket.

The charging harness comprising at least one lead has, for example, two connector elements, one of which is arranged, respectively, at each end of the charging harness. Via the connector elements, the charging harness can be electrically connected to the battery and to the vehicle-side charging interface for the purpose of transmitting electrical energy. For the purpose of cooling the charging harness unit, the at least one lead has the cooling channel through which the cooling fluid can flow. The cooling channel is fluidically connected, for example, to the connector elements. In particular, a liquid, in particular a water-glycol mixture, is used as a cooling fluid.

In summary, the charging harness is thus cooled by means of the cooling fluid, which enables the charging harness to transmit a particularly high electrical power from the vehicle-side charging interface to the battery. The higher the transmission power of a transmitted electrical energy in the charging harness, the greater is an increase in temperature in the charging harness, as a transmission medium. If the transmission medium is not cooled, a maximum temperature for the transmission medium thus defines a maximum capacity of the transmission medium to transmit electrical energy. If, in particular, heat is actively removed from the transmission medium, and thus from the charging harness, by means of the cooling fluid, a particularly high electrical energy transmission capacity can be realized since, due to the cooling, the transmission medium heats up less than the non-cooled transmission medium during the transmission of electrical energy, and thus reaches the maximum temperature only at a maximum transmission power that is higher than that of the non-cooled transmission medium. Thus the cooled charging harness unit renders possible a particularly high transmission power of electrical energy from the vehicle-side charging interface to the motor-vehicle battery. The cooling of the charging harness therefore enables the motor vehicle to have a particularly high receiving capacity for the electrical energy received from the charging station. The motor-vehicle battery can therefore be charged particularly rapidly, in particular if the charging station provides electrical energy at a particularly high charging output.

It has been found to be advantageous, in particular, if the charging harness has exactly two leads. In other words, the battery and the vehicle-side charging interface are connected to each other via the two leads. The leads in this case run in parallel from the battery to the vehicle-side charging interface. Each of the leads has a cooling channel, such that a particularly large cooling surface can be realized on the cooling channels in relation to the transmission capacity of the leads.

In a further advantageous development of the invention, a deflection, by means of which cooling fluid can be deflected from at least one of the leads into at least one other of the leads, is provided at one of the ends. In other words, by means of the deflection, which may also be referred to as a cooling-circuit deflector, cooling fluid received from one of the leads is introduced into another of the leads by means of the deflection. The cooling fluid thus flows into a first of the leads from the battery toward the vehicle-side charging interface, and the cooling fluid flows into another of the leads from the vehicle-side charging interface toward the battery. The deflection may be arranged at the end assigned to the battery or at the end of the charging harness assigned to the vehicle-side charging interface. For example, the deflection is arranged in one of the connector elements, in particular in the connector element that can be connected to the vehicle-side charging interface. Alternatively, the deflection may be integrated into the charging interface. The deflection causes a direction of flow of the cooling fluid in the leads to run in the opposite direction. It is thereby possible to achieve a U-shaped cooling-fluid duct that, together with the cooling device, forms a closed cooling circuit. In the case of a plurality of lines, a plurality of deflections may be provided, in order to guide the cooling fluid in a meandering manner, via the cooling channels, between the battery and the vehicle-side charging interface. The deflection allows the charging harness unit to be cooled by a single cooling circuit. The deflection thus renders possible particularly simple cooling of the charging harness, or harness unit.

In a further advantageous development of the invention, a cooling-fluid inlet and a cooling-fluid outlet, via which the charging harness is fluidically connected to the cooling device, are provided at one of the ends. This means, for example, that one of the connector elements has the deflection and the other of the connector elements has the cooling-fluid inlet and the cooling-fluid outlet. The cooling fluid from the cooling channel can be exchanged with an environment of the charging harness via the cooling-fluid inlet and the cooling-fluid outlet. In particular, via the cooling-fluid inlet and the cooling-fluid outlet, the cooling fluid can be exchanged between the charging harness and the cooling device. In particular, the cooling channels can be connected to the cooling device via the cooling-fluid inlet and the cooling-fluid outlet. The cooling-fluid inlet and the cooling-fluid outlet may be arranged on the same connector element, or each on one of the connector elements and thus on different connector elements. Arranging the cooling-fluid inlet and the cooling-fluid outlet on the same connector element has the advantage that the respective connections of the cooling-fluid inlet and the cooling-fluid outlet to the cooling device can be made particularly short if the cooling device is arranged particularly close to the connector element comprising the cooling-fluid inlet and the cooling-fluid outlet. The cooling-fluid inlet and the cooling-fluid outlet enable the cooling fluid to be let into and removed from the charging harness in a particularly advantageous manner. Advantageously, the cooling-fluid inlet and the cooling-fluid outlet allow cool cooling fluid to be fed into the cooling channel and heated cooling fluid to be removed from the cooling channel. In this way a permanent cooling of the charging harness can be achieved.

It has been found to be advantageous, in particular, if the at least one lead has a central cooling-fluid hose for conducting the cooling fluid, an inner conductor for conducting electrical energy, a shielding and at least one insulation. This means that at least one of the leads, in particular each of the leads, has the centrally arranged plastic cooling-fluid hose, which extends, in particular, over an entire length of the respective lead and provides the cooling channel. On the outside of the cooling-fluid hose, the inner conductor, which for example has a cross-sectional area of 35 square millimeters and/or is made of copper, may lie against the cooling-fluid hose. The inner conductor is to be understood to be, in particular, a high-voltage lead. The inner conductor may be surrounded by a first insulation that insulates the inner conductor outwardly. The shielding, which in particular comprises a shielding braid of galvanized copper, may be arranged on the outer circumference of the first insulation or so as to lie directly against the inner conductor. A second insulation, for example made of a silicone rubber, may be arranged on the outside of the shielding. Both the inner conductor and the shielding, as well as the respective insulations, may outwardly cover the cooling-fluid hose over the entire circumference as well as over its entire length. The centrally arranged cooling channel, which is surrounded on the circumference by the inner conductor, has a particularly large contact surface with the inner conductor for a given cross-sectional area of the inner conductor, such that a particularly large amount of heat can be dissipated from the inner conductor via the cooling channel. Such cables can therefore be cooled particularly effectively.

In an alternative development of the leads, the at least one lead may have a central lead core that is wrapped helically by at least one cooling-fluid hose. This means that the lead core extends centrally in the lead over its entire length. In particular, the cable core may be a single-core inner conductor. The inner conductor is to be understood to be, in particular, a high-voltage lead. The lead core is wrapped along its direction of longitudinal extent by at least one cooling-fluid hose, such that the lead core can be cooled circumferentially by the cooling fluid, by means of the cooling-fluid hose providing the cooling channel. The cooling-fluid hose wrapped helically around the lead core renders possible a multiple, helical flow around the cable core, in particular if a plurality of cooling-fluid hoses, wrapped helically around the cable core, are used. In particular, if a plurality of cooling-fluid hoses are used to effect a multiple flow around the lead core, cooling of the lead core can be adjusted by means of a respective temperature of the cooling fluid, or by guiding the cooling fluid through the cooling-fluid hoses. In particular, the plurality of cooling-fluid hoses wrapped helically around the lead core may be interconnected in such a manner that constant cooling of the respective lead is possible over its entire length. The lead having the central core is shielded and insulated, in particular outwardly.

In a further advantageous development of the invention it is provided that, for the purpose of exchanging cooling fluid with the battery, the end of the charging harness that is assigned to the battery can be fluidically coupled to the battery. This means that the connector element connected to the battery has the cooling-fluid inlet and the cooling-fluid outlet. The charging harness can be fluidically coupled to the battery via the cooling-fluid inlet and the cooling-fluid outlet. For example, both the connector element, having the cooling-fluid inlet and the cooling-fluid outlet, and the battery have respective electrical and fluidic interfaces that can be coupled to each other when the charging harness is connected to the battery. Thus, by coupling the charging harness to the battery, both a fluidic and an electrical connection is created between the charging harness and the battery. The electrical connection between the charging harness and the battery enables electrical energy that has been received by means of the vehicle-side charging interface and transmitted via the charging harness to be transmitted to the battery. The fluidic connection between the battery and the charging harness enables the cooling fluid to be exchanged between the battery and the charging harness. The cooling channel can thus be coupled to a battery cooling system of the battery. Thus, by means of the battery cooling system, the battery and the charging harness can be cooled together. For example, the cooling device is the battery cooling system, with which the cooling channel of the charging harness forms a closed cooling circuit. Thus, advantageously, both the battery and the charging current can be cooled together by means of the battery cooling system.

In an alternative development of the invention, it is provided that the charging harness can be fluidically coupled to the cooling device with bypassing of the battery. Thus, the vehicle-side cooling device is arranged outside the battery. The charging harness can thus only be electrically coupled to the battery via the connector element having the cooling-fluid inlet and the cooling-fluid outlet. The cooling fluid is fed to the cooling channel via the cooling-fluid inlet, bypassing the battery, and is removed from the cooling channel via the cooling-fluid outlet, bypassing the battery. The charging harness and the battery are thus fluidically independent of each other. This is advantageous, in particular, if the charging harness and the battery have differing cooling requirements. Respective cooling requirements may be specially adapted to the charging harness, or to the battery, by means of a battery cooling circuit of the battery cooling system and by means of the charging harness unit, and can thus be implemented in a particularly advantageous manner.

The charging harness unit may be used, in particular, in connection with a charging system for a motor vehicle that can be operated electrically. In addition to the charging harness unit, the charging system may comprise the vehicle battery by means of which electrical energy can be provided for the drive of the motor vehicle, and the vehicle-side charging interface, in particular the vehicle-side charging socket that, for the purpose of charging the battery, can be connected to the connection element of the energy source that is external to the vehicle.

Further features of the invention are given by the claims, the figures and the description of the figures. The features and combinations of features mentioned above in the description, as well as the features and combinations of features mentioned below in the description of the figures and/or shown in the figures alone can be used not only in the combination indicated in each case, but also in other combinations or on their own.

The invention is now explained in greater detail on the basis of a preferred exemplary embodiment and with reference to the drawings.

DETAILED DESCRIPTION OF THE DRAWINGS

Figure 1:
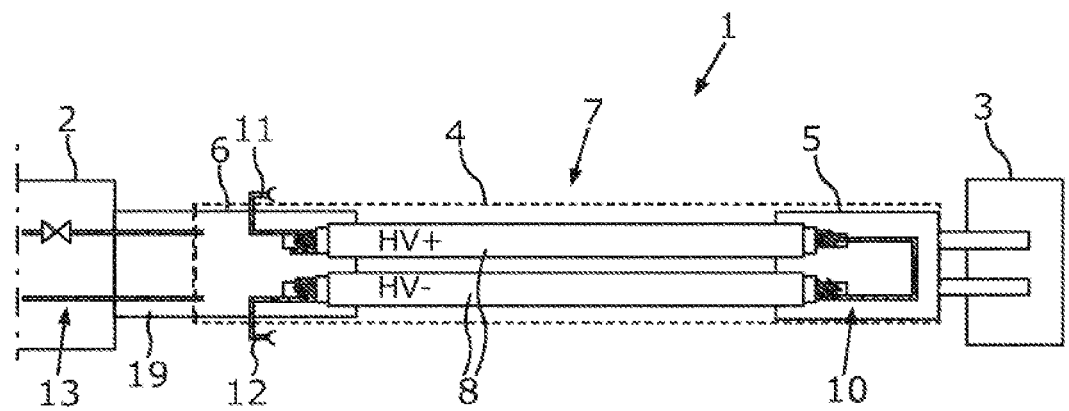
FIG. 1 is a schematic view of a charging system, comprising a battery for providing electrical energy for operating a motor vehicle, a vehicle-side charging interface by which electrical energy can be received from a charging station, and a charging harness unit by which the electrical energy received via the vehicle-side charging interface can be transmitted to the battery, the charging harness unit having a cooling channel, through which a cooling fluid can flow for a particularly high transmission output of electrical energy from the vehicle-side charging interface to the battery, which cooling channel, together with a cooling device of the motor vehicle, forms a cooling circuit that fluidically bypasses the battery.

Represented in FIG. 1 is a charging system 1, by means of which a battery 2 of a motor vehicle that can be operated electrically can be charged. By means of the battery 2, electrical energy can be provided for an electric drive of the motor vehicle in order to drive the motor vehicle, which is in particular an electric vehicle. To charge the battery 2, the motor vehicle must be connected to a charging station, external to the vehicle, that provides electrical energy for the motor vehicle. The charging station in this case may provide the electrical energy for the motor vehicle either conductively or inductively. The motor vehicle has a vehicle-side charging interface 3 by means of which the electrical energy provided by the charging station can be received.

A charging harness unit 4 is provided to transfer the electrical energy from the vehicle-side charging interface 3, which in this case is realized as a charging socket, to the battery 2. The charging harness unit 4 in this case has a first connector element 5 and a second connector element 6. The first connector element 5 is arranged at a first end of the charging harness unit 4, and the second connector element 6 is located at the other, second end of the charging harness unit 4. Via the first connector element 5, the charging harness device 4 can be connected to the vehicle-side charging interface 3. Via the electrical connection from the vehicle-side charging interface 3 to the first connector element 5, the electrical energy received from the charging station, via the vehicle-side charging interface 3, can be transferred to the charging harness unit 4. The second connector element 6 can be electrically connected to the battery 2 of the motor vehicle in order to provide the electrical energy for battery 2. The electrical energy is in this case transferred from the first connector element 5 to the second connector element 6 by means of the charging harness unit 4. The electrical energy for the battery 2 is provided via the second connector element 6, which can be electrically connected to the battery 2.

In this case, in addition to the connector elements 5, 6, the charging harness unit 4 comprises a charging harness 7, via which the connector elements 5, 6 are connected to each other. The charging harness 7 in turn comprises two leads 8, each of which is designed to transmit electrical energy. To enable the electrical energy to be transmitted from the vehicle-side charging interface 3 to the battery 2 by means of the charging harness 7 with a particularly high transmission output, the leads 8 have respective cooling channels 9, through which a cooling fluid can flow to cool the charging harness unit 4. The cooling channels 9 can be supplied with the cooling fluid via a vehicle-side cooling device, not represented in the figures.

The structure of the leads 8 will be discussed in greater detail in connection with FIG. 3.

The cooling channels 9 arranged in the leads 8, together with the cooling device, form a closed cooling circuit for cooling the charging harness unit 4. In order to provide the closed cooling circuit, the first connector element 5 has a deflection 10, by means of which cooling fluid flowing out of one of the leads 8 can be deflected into the other lead 8. Thus, via the leads 8, the cooling fluid is thus routed in a U shape in the charging harness unit 4. The cooling fluid flows through the leads 8 in an opposite direction, with one direction of flow of the cooling fluid through a first of the leads 8 being parallel to a direction of flow in the second lead 8, and the direction of flow of the cooling fluid in the second lead 8 being opposite to a direction of flow in the first lead 8.

For the purpose of introducing the cooling fluid into the charging harness 7, the second connector element 6 has a cooling-fluid inlet 11, via which the cooling fluid can flow into the charging harness 7. For the purpose of removing the cooling fluid from the charging harness 7, the second connector element 6 has a cooling-fluid outlet 12, via which the cooling fluid can be removed from the charging harness 7. In particular, the cooling fluid can be supplied to the charging harness unit 4 via the cooling-fluid inlet, and the cooling fluid can be removed from the charging harness unit 4 via the cooling-fluid outlet 12.

As represented in FIG. 1, the second connector element 6 is realized, in a first embodiment, in such a manner that the charging harness unit is electrically coupled to the battery 2 via the second connector element 6. In this case, in the first embodiment, the cooling fluid is supplied to and removed from the charging harness unit 4 with bypassing of the battery 2.

Figure 2:
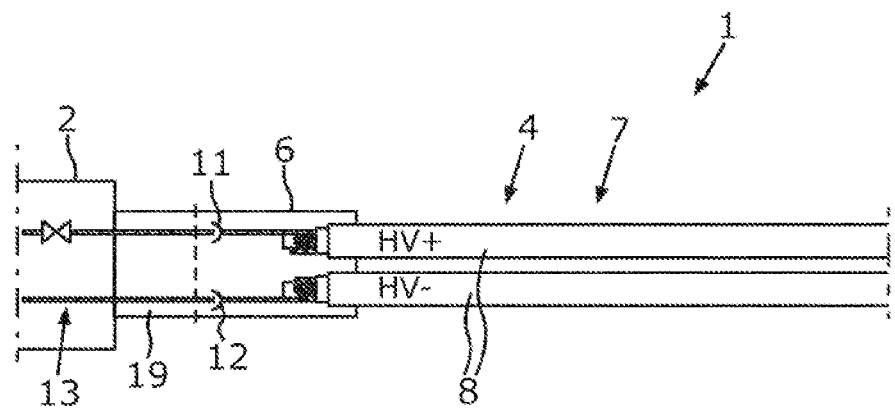
FIG. 2 is a schematic view of a portion of an end of the charging harness unit connected to the battery, in an alternative embodiment, the cooling channel of the charging harness unit being connected both electrically and fluidically to the battery, such that the charging harness unit is fluidically connected to a battery cooling system of the battery via the cooling fluid.

Represented in FIG. 2 is the second connector element 6 in an alternative, second embodiment, in which the charging harness unit 4 can be coupled both fluidically and electrically to the battery 2 via the second connector element 6. In particular, the cooling-fluid inlet 11 and the cooling-fluid outlet 12 can be connected to a battery cooling system 13 of battery 2 via the second connector element 6 in order to exchange cooling fluid with the battery cooling system 13. The cooling device may thus be the battery cooling system 13 or an internal vehicle cooling system different from the battery cooling system 13, in particular a vehicle-side cooling circuit.

Figure 3:
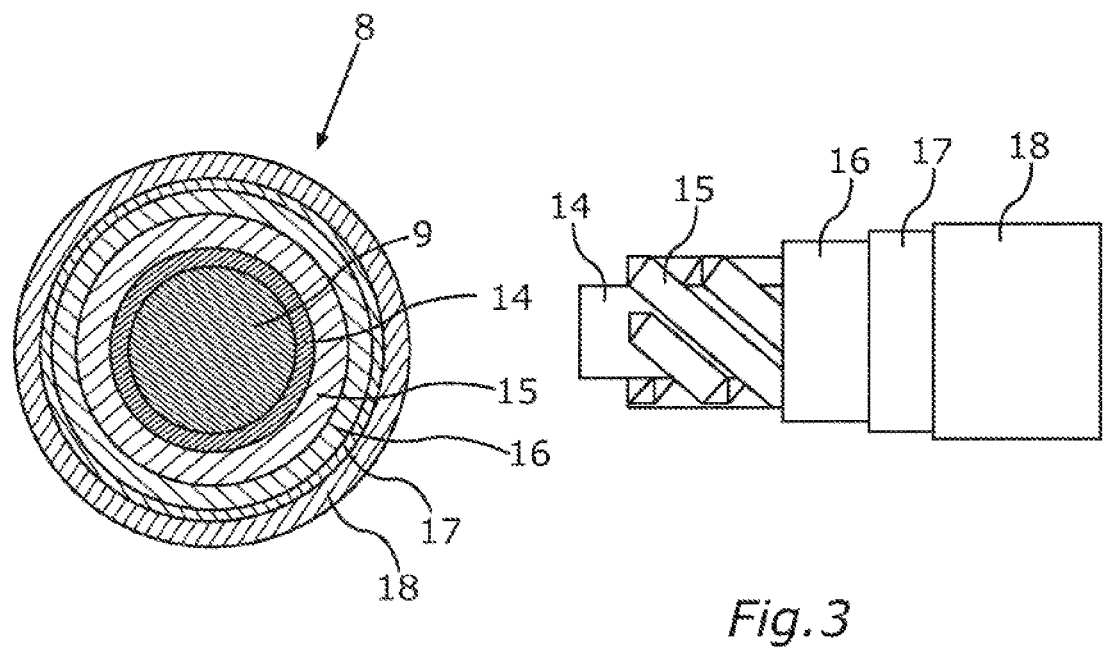
FIG. 3 is a schematic sectional view and a schematic layered view of a lead of the charging harness unit, wherein extending centrally in the lead there is a cooling-fluid hose that is surrounded on the circumference, over the entire length of the lead, by an inner conductor for conducting electrical energy.

In FIG. 3, the lead 8 is shown in a sectional and layered representation, in a first embodiment. The leads 8 may be goods supplied by the meter. In the first embodiment, the lead 8 has the centrally arranged cooling channel 9 that is provided by a plastic cooling-fluid hose 14. The cooling-fluid hose 14 may be made of a perfluoroalkoxy polymer having a maximum temperature of 180 degrees Celsius, or of a polyamide plastic having a maximum temperature of 150 degrees Celsius. The central cooling-fluid hose 14 may be surrounded by an inner conductor 15 designed to conduct electrical energy. The inner conductor 15 may be made of copper and have a cross-section of 35 square millimeters. The inner conductor 15 is covered outwardly by a first insulation 16. The first insulation 16, in turn, is covered outwardly by a shielding braid of galvanized copper, as a shielding 17. As the outermost layer, the lead 8 has a second insulation 18 made of silicone rubber.

Figure 4:
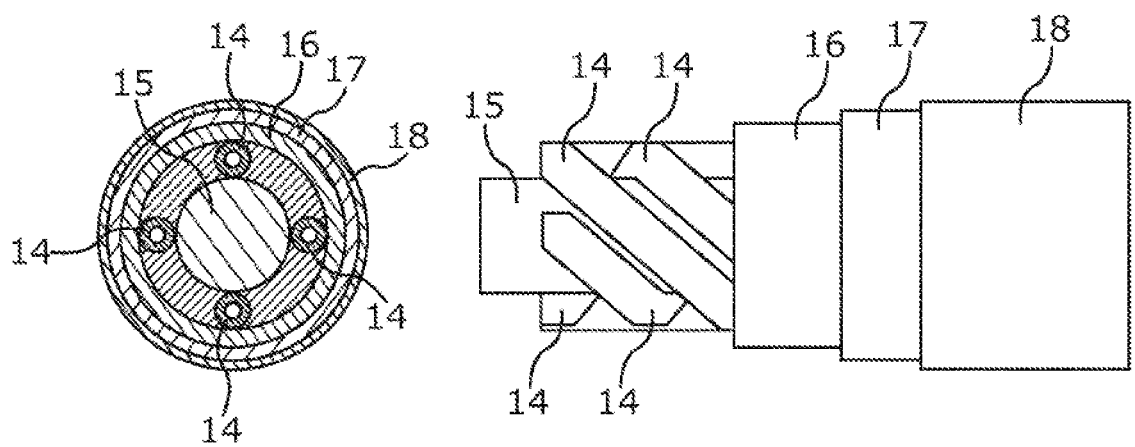
FIG. 4 is a schematic sectional view and a schematic layered view of a lead of the charging harness unit, wherein arranged centrally in the lead is the inner conductor that is wrapped helically by a plurality of cooling-fluid hoses for cooling the inner conductor.

In an alternative embodiment of the lead 8, represented in FIG. 4, the lead 8 may comprise a single-core, shielded high-voltage cable, as an inner conductor 15. In this case, there is a multiple helical flow around the inner conductor 15. The inner conductor 15 in this case is wrapped helically by four cooling-fluid hoses 14. Fluid flowing in the cooling-fluid hoses 14 can flow in mutually opposite directions, and thus in counter-flow along a direction of longitudinal extent of the associated lead 8. As shown in FIG. 4, in this embodiment, the lead 8 may also have the first insulation 16, the shielding 17 and the second insulation 18.

Figure 5:
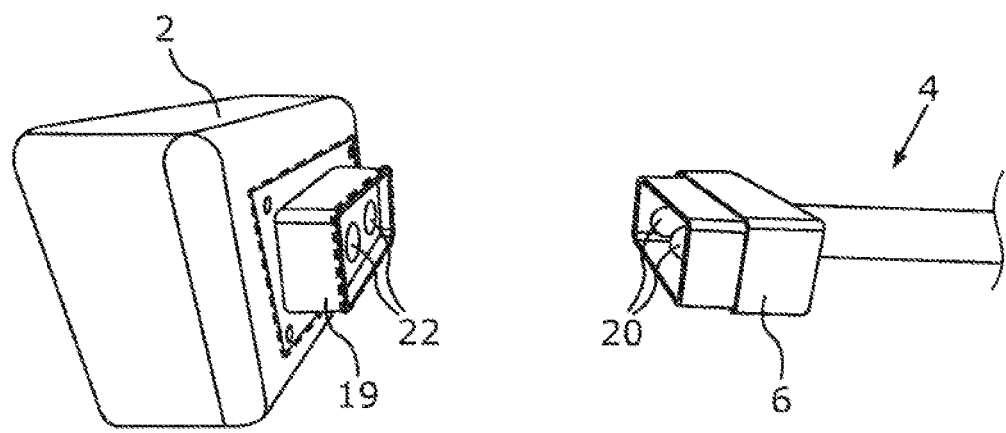
FIG. 5 is a schematic perspective view of the battery and a of portion of the charging harness unit, wherein a second connector element is provided, which can be connected to a power-unit connector of the battery.

FIG. 5 shows a portion of the battery 2 with the power-unit connector 19, and the charging harness unit 4 with the second connector element 6. As can be seen in FIG. 5, the power-unit connector 19 and the second connector element 6 have mutually corresponding electrical contacts 20, 22. For the purpose electrically connecting the charging harness unit 4 to the battery 2, the first electrical contacts 20 of the second connector element 6 are inserted into the second electrical contacts 22 of the battery 2.

The described charging system 1 is based on the knowledge that, in the charging of electric vehicles, temperature development in respective power leads proves to be a power limit. In this case, the temperature development in the power leads defines a lower limit for a charging time. Appropriate cooling of the electrical power leads permits particularly high currents, and thus particularly high power levels and particularly short charging times. Another critical location in the current path are contact points between conductors. Due to the higher resistances resulting from the contact surface, a lot of heat is generated at contact points.

The charging harness unit 4 enables both the leads 8 and the connector elements 5, 6 to be cooled via the deflection 10, or the cooling-fluid inlet 11 and the cooling-fluid outlet 12, to enable particularly high electrical energy transmission capacities in the charging harness unit 4.

The charging system 1 comprises the cable 8 by the meter, the two connector elements 5 and 6, which in particular may be respective plugs, the vehicle-side charging interface 3 realized as a charging socket, and the battery 2, having a power-unit connector 19, via which the second connector element 6 can be connected to the battery 2 and which is, in particular, an adapter. In the first embodiment, the power-unit connector 19 is a two-pole high-voltage power-unit connector having electrical connections.

In addition to having a contacting for the electric current, via which electric current can be provided for the battery 2, the second connector element 6 has two cooling-fluid connections, in this case the cooling-fluid inlet 11 and the cooling-fluid outlet 12. The second connector element 6 is shown in the figures, represented in two different embodiments. In the first embodiment represented in FIG. 1, the cooling-fluid inlet 11 and the cooling-fluid outlet 12 projects laterally from the second connector element 6, and in particular away from the power-unit connector 19 of the battery 2. The cooling-fluid inlet 11 and the cooling-fluid outlet 12 are thus connected to the cooling device in a separate operation. An electrical contacting of the inner conductor 15 via a round crimp makes it possible to route the cooling-fluid hose 14 in the second connector element 6 such that it projects over the contacting and thus continues separately.

In the case of the second, alternative embodiment of the second connector element 6, represented in FIG. 2, the cooling-fluid inlet 11 and the cooling-fluid outlet 12 are integrated into a housing of the connector element 6 and are oriented in the same direction as the electrical connections of the second connector element 6. By means of a quick coupling, the cooling-fluid inlet 11 and the cooling-fluid outlet 12 may be connected in one operation, together with an electrical contacting, to the power-unit connector 19 in order to be connected to battery 2. The two different contactings, electrical contacts and fluidic contacts, of the second connector element 6 are in this separated from each other by a seal. Furthermore, the respective electrical contacts may be sealed against each other, and the respective fluidic contacts sealed against each other. In the second embodiment, the power-unit connector 19 is realized as a two-pole high-voltage power-unit connector having electrical and fluidic connections.

The first connector element 5 makes it possible to connect the charging harness unit 4 to a conventional, non-cooled electrical power system. The cooling fluid circuit turns via the deflection 10 in the first connector element 5. An external supply or discharge of cooling fluid from the charging harness unit 4 is not provided in the first connector element 5. In this way the charging harness unit 4 can be used flexibly and combined with conventional electrical power systems. The first connector element 5 has the deflection 10 for the cooling fluid, as well as a contacting for the electric current in order to electrically contact the first connector element 5 to the vehicle-side charging interface 3. In particular, the first connector element 5 can be directly connected to the vehicle-side charging interface 3.

The charging harness unit 4 renders possible a uniform overall system, having a low level of functional and structural design integration complexity, with a particularly low installation space requirement, that can be cooled collectively. Furthermore, the charging harness unit 4 renders possible a particularly high transmission capacity for electrical energy. The charging harness unit 4 in this case renders possible a particularly high stationary charging capacity and a particularly high non-stationary operating load. By means of the charging harness unit 4, a particularly short charging time can be achieved for specified charging energies. In addition, the charging harness unit 4 has a particularly low weight in comparison with non-cooled lead sets of an equal load. Furthermore, the charging harness unit 4 has particularly low unit costs in comparison with non-cooled leads of an equal load. The weight and unit cost advantages of the charging harness unit 4 are achieved, in particular, due to a particularly small cross-section of the inner conductor 15, in the case of the cooled embodiment, compared to an inner conductor of an equal load.

In addition to connection of the battery 2 to the charging interface 3, a further charging harness unit 4 may be used to connect the battery to an electrical machine designed to operate the vehicle electrically, in particular to drive it. In particular, a plurality of electrical components within the motor vehicle may be connected to each other at least electrically, in particular electrically and fluidically, by means of respective charging harness units 4.

LIST OF REFERENCES 1 charging system
2 battery
3 charging interface
4 charging harness unit
5 first connector element
6 second connector element
7 charging harness
8 lead
9 cooling channel
10 deflection
11 cooling-fluid inlet
12 cooling-fluid outlet
13 battery cooling system
14 cooling-fluid hose
15 inner conductor
16 insulation
17 shielding
18 insulation
19 power-unit connector
20 first electrical contacts
22 second electrical contacts

What is claimed is:
1. A charging harness unit for a battery of a motor vehicle, comprising:
a charging harness having at least one lead and first and second ends, the first end being on a battery side and the second end being connectable to a charging station that is external to the vehicle, wherein
a cooling channel through which a cooling fluid flows is arranged in the charging harness,
the cooling channel is supplied with the cooling fluid via a cooling device arranged on a vehicle side, and
a deflection is provided at one of the first and second ends and is configured to cause the fluid that flows through the cooling channel in a first direction to flow through the cooling channel in a second direction opposite to the first direction.

2. The charging harness unit according to claim 1, wherein
the charging harness has exactly two leads.

3. The charging harness unit according to claim 1, wherein
the deflection, is configured to deflect the cooling fluid from at least one of the leads into at least one other of the leads.

4. The charging harness unit according to claim 1, wherein
a cooling-fluid inlet and a cooling-fluid outlet, via which the charging harness is fluidically connected to the cooling device, are provided at one of the first and second ends.

5. The charging harness unit according to claim 1, wherein
the at least one lead has a central cooling-fluid hose for conducting the cooling fluid, an inner conductor for conducting electrical energy, a shielding, and at least one insulation.

6. The charging harness unit according to claim 1, wherein
the at least one lead has a central lead core that is wrapped helically by at least one cooling-fluid hose.

7. The charging harness unit according to claim 1, wherein
for exchanging cooling fluid with the battery, the first end of the charging harness that is assigned to the battery is fluidically couplable to the battery.

8. The charging harness unit according to claim 1, wherein
the charging harness is fluidically couplable to the cooling device with bypassing of the battery.

9. A charging harness unit for a battery of a motor vehicle, comprising:
a charging harness having at least one lead and first and second ends, the first end being on a battery side and the second end being connectable to a charging station that is external to the vehicle, wherein
a cooling channel through which a cooling fluid flows is arranged in the charging harness,
the cooling channel is supplied with the cooling fluid via a cooling device arranged on a vehicle side, and
the at least one lead has a central cooling-fluid hose for conducting the cooling fluid, an inner conductor for conducting electrical energy, a shielding, and at least one insulation.

10. The charging harness unit according to claim 9, wherein
the charging harness has exactly two leads.

11. The charging harness unit according to claim 9, wherein a deflection, by which the cooling fluid is deflected from at least one of the leads into at least one other of the leads, is provided at one of the first and second ends.

12. The charging harness unit according to claim 9, wherein
a cooling-fluid inlet and a cooling-fluid outlet, via which the charging harness is fluidically connected to the cooling device, are provided at one of the first and second ends.

13. The charging harness unit according to claim 9, wherein
for exchanging cooling fluid with the battery, the first end of the charging harness that is assigned to the battery is fluidically couplable to the battery.

14. The charging harness unit according to claim 9, wherein
the charging harness is fluidically couplable to the cooling device with bypassing of the battery.

15. A charging harness unit for a battery of a motor vehicle, comprising:
a charging harness having at least one lead and first and second ends, the first end being on a battery side and the second end being connectable to a charging station that is external to the vehicle, wherein
a cooling channel through which a cooling fluid flows is arranged in the charging harness,
the cooling channel is supplied with the cooling fluid via a cooling device arranged on a vehicle side, and
the at least one lead has a central lead core that is wrapped helically by at least one cooling-fluid hose.

16. The charging harness unit according to claim 15, wherein
the charging harness has exactly two leads.

17. The charging harness unit according to claim 15, wherein
a deflection, by which the cooling fluid is deflected from at least one of the leads into at least one other of the leads, is provided at one of the first and second ends.

18. The charging harness unit according to claim 15, wherein
a cooling-fluid inlet and a cooling-fluid outlet, via which the charging harness is fluidically connected to the cooling device, are provided at one of the first and second ends.

19. The charging harness unit according to claim 15, wherein
for exchanging cooling fluid with the battery, the first end of the charging harness that is assigned to the battery is fluidically couplable to the battery.

20. The charging harness unit according to claim 15, wherein
the charging harness is fluidically couplable to the cooling device with bypassing of the battery.

* * * * *